(12) United States Patent
Huang

(10) Patent No.: US 6,222,951 B1
(45) Date of Patent: Apr. 24, 2001

(54) SILICON-BASED SILICON-GERMANIUM INTEGRATED-CIRCUIT OPTICAL NETWORK UNIT

(76) Inventor: Fengyi Huang, 386 Seaman Rd., Stormville, NY (US) 12582

( * ) Notice: Subject to any disclaimer, the term of this patent is extended or adjusted under 35 U.S.C. 154(b) by 0 days.

(21) Appl. No.: 09/541,532

(22) Filed: Apr. 3, 2000

(51) Int. Cl.$^7$ .................................................. G02B 6/12
(52) U.S. Cl. .................................................................. 385/14
(58) Field of Search .............................. 385/14–16, 147, 385/2, 10, 12, 37, 40, 31; 359/245, 6, 7, 561

(56) References Cited

U.S. PATENT DOCUMENTS

| | | | |
|---|---|---|---|
| 4,997,246 | * 3/1991 | May et al. | 385/2 |
| 5,132,811 | * 7/1992 | Iwaki et al. | 359/6 |
| 5,625,729 | * 4/1997 | Brown | 385/31 |
| 6,075,908 | * 6/2000 | Paniccia et al. | 385/14 |

* cited by examiner

Primary Examiner—Akm E. Ullah (57) ABSTRACT

An optical network unit includes silicon-germanium electronic and optoelectronic devices and silicon-based very large scale integrated circuits (VLSIs) monolithically integrated in the save substrate and method of fabrication therefor. The optical network unit installed at a local computer is connected to incoming and outgoing optical fibers for receiving information from and transmitting information to the fiber network system. An optical branching circuit includes an optical coupler splits the incoming light from the fiber into two parts. One branch of the light is detected by a photodetector and subsequently amplified before sent to electronic circuit for down-loading data from the fiber network. Another branch of the light guided by optical waveguide is connected to a modulator. The modulator modulates the light of the second branch according to the electrical signal from the local electronic circuits. The modulated light is then fed back to the fiber network for up-loading data from the local computer. The splitter, photodetector, and optical modulator can be constructed in a single waveguide structure with electrical isolation between the detector and modulator.

16 Claims, 5 Drawing Sheets

SILICON-BASED SILICON-GERMANIUM INTEGRATED-CIRCUIT OPTICAL NETWORK UNIT

BACKGROUND OF THE INVENTION

1. Field of the Invention

This invention relates to a communication system utilizing optical fibers, and more particularly to a unit that connects individual computers to the fiber network system. The components for receiving the optical signals from and transmitting the optical signals to the fiber network system are fabricated in a batch-process fashion and integrated monolithically into the silicon-based electronic integrated circuits.

2. Description of Related Arts

Due primarily to their low loss and high-bandwidth, optical fibers are utilized in a wide variety of communication systems such as long-haul fiber systems. The recent advance in the fiber communication includes the construction of a fiber-to-the-fence infrastructure, promising the delivery of a large amount of information to homes and offices. However, the relatively expensive terminal equipment, such as a highly stable laser source required for transmitting the light signal, restricts the usage to central stations and prohibits the commercialization of a fiber network system that can download information from the network to the local user and further deliver information from the local user to the network.

One of the possible approaches to solve this cost dilemma is to provide the light source from a central station to individual customers, and split the incoming light from the fiber into two portions at the customer location. One portion is detected and converted to electrical signal and then processed by the local computer. Another portion of the incoming light is modulated by electrical signals from the local computer and then feed back to the fiber network system. Such a system will enable the connection of a computer to the network system with high speed and high data throughput capabilities.

Nevertheless, optical networks utilizing the most frequently used light wavelengths (i.e., 1.3 $\mu$m and 1.55 $\mu$m wavelength for low loss transmission) normally require the network unit be built from light sensitive materials such as GaAs or InP at the corresponding wavelengths. Those materials are relatively expensive as compared to the popular silicon substrate. Moreover, the device fabrication processes for GaAs and InP are not compatible with the existing mature silicon integrated circuit technology, which serves as the backbone for the fast-growing electronic computer industry.

Although silicon chips have the advantage of low cost and easy processing, silicon material alone cannot response to the light wavelength used in the long-haul fiber system. In order to build individual devices from GaAs, InP or other silicon-based materials such as silicon-germanium or silicon-germanium-carbon to form optical splitters, photodetectors, optical modulators and electrical amplifiers required by the optical network unit, put them together onto a silicon integrated circuit chip and will yield a bulky and costly unit. It is therefore highly desirable to integrate the electrical and optical components of the network unit with the integrated circuit chip in the same silicon substrate. The trend to move towards silicon-based silicon-germanium optical integrated circuit for optical network unit can be seen in the prior art.

U.S. Pat. No. 4,754,452 to Henry describes an optical local area network system wherein one carrier source is shared by a cascade of users in the system.

U.S. Pat. No. 5,577,139 and No. 5,577,138 to Chandrasekhar et al (hereafter referred to as the prior art) disclose an integrated-circuit optical network unit wherein the unit is made in an integrated-circuit form based on $In_{0.53}Ga_{0.47}As$ and $In_{0.65}Ga_{0.35}As_{0.7}P_{0.3}$ compound materials system lattice matched to the InP substrate.

Since InP-based InGaAs compound has a direct bandgap of energy below 1.55 $\mu$m wavelength, the absorption coefficient is large; and a small InGaAs thickness on the order of a micron meter will yield a sufficient light absorption at this wavelength. As a result, the InP-based network unit can be built in a surface normal fashion, wherein the incoming and outgoing optical waves are perpendicular to the surface of the substrate material.

Silicon-based materials, on the other hand, suffer several difficulties in constructing a similar network unit using the previous art. Firstly, silicon-based materials are nearly transparent to optical light at 1.55 $\mu$m wavelength. As a result, other alloys such as silicon-germanium with a narrower bandgap have to be incorporated. Due to the lattice mismatch of silicon-germanium alloy from the silicon substrate, it is extremely hard, if not totally impossible, to grow high quality silicon-germanium alloy with a large thickness of several microns. Secondly, due to the small optical absorption coefficient of silicon-germanium alloy at 1.55 $\mu$m, a waveguide structure has to be used to increase the absorption length. Therefore, a surface-normal form of the network unit as described in the prior art based on the InP system is no longer applicable in the silicon system.

Although silicon-based optoelectronic devices such as photodetectors and optical modulators have been demonstrate, and optical receiver system with a certain degree of integration into electronic circuitry has been reported, an integrated circuits designed specifically for an optical network unit operating at the 1.3 $\mu$m and 1.55 $\mu$m wavelengths has never been disclosed.

U.S. Pat. No. 4,426,440 to Thompson devices an integrated optical grating by thermal $SiO_2$ grown on Si.

U.S. Pat. No. 4,787,691 to Lorenzo et al describes all silicon electrooptical devices for modulating and switching of guided light wherein a silicon-on-insulator approach has been used.

U.S. Pat. No. 4,789,642 and U.S. Pat. No. 4,857,973 to Soref et al disclose a method of fabricating low loss crystalline silicon waveguide by dielectric implantation, and a method of integration with a Schottky barrier photodetector.

U.S. Pat. No. 4,787,691 to Soref et al describes an optical modulator based on a silicon-on-sapphire substrate. This modulator applies the free carrier effect to achieve modulation of light in the 1.3–1.55 $\mu$m wavelength range by injecting external current to the waveguide.

Some publications related to major developments in silicon-based optoelectronic devices are also included here for general reference purposes. "A self-aligned SiGe base bipolar technology using cold wall UHV-CVD and its application to optical communication ICs," by Sato, et al., IEEE Trans. Electronic Devices, vol.42, p.82–88 1995, described a silicon-based electronic amplifier. A book chapter entitled "Si-based superlattices: Photonic applications," in *Handbook of Thin Film Process Technology*, (IOP Publishing Ltd, England, 1997), chapter F6., by Huang and Jalali presented an overview of the related art.

As compared to the optical network unit disclosed by the prior art using InP based-material system, the silicon-based optical network unit to be disclosed in the present art has the unique feature of being able to integrate into the silicon electronic integrated circuits (ICs), which promises huge cost reduction as compared to the InP-based systems. IBM Corporation has commercialized silicon-germanium heterojunction bipolar transistors (HBTs) monolithically integrated with silicon complimentary metal oxide semiconductor (CMOS) circuits. The silicon-germanium HBTs can operate much faster than the CMOS amplifier, and thus can be served as the amplifier device needed for high speed application in the present invention.

The aforementioned silicon-based monolithically integrated fiber network units, with superior features of low cost, high reliability, and easy in integration with the silicon integrated circuits, will provide a building block for high speed and affordable broadband optical network system accessible by small network service providers or even individual computer users.

SUMMARY OF THE INVENTION

It is therefore an objective of the present invention to provide an optical network unit comprising silicon-germanium electronic and optoelectronic devices fabricated in a batch-process fashion on a silicon-based ultra large scale integrated circuit (ULSI) chip.

Another objective of the present invention is to install the optical network unit at a customer location connected to incoming and outgoing fibers for receiving information from and transmitting information to the fiber network system.

A further objective of the present invention is to provide the means whereby incoming optical signal from the fiber can be guided by silicon-on-insulator (SOI) waveguide and split into two portions by a beam splitter utilizing an optical coupler.

A further objective of the present invention is to provide the means to detect one branch of the split light by a p-i-n photodetector formed from multi-layered silicon-germanium alloy sandwiched between silicon layers. The germanium content in the silicon-germanium alloy is high enough (such as greater than 50%) to generate appreciable optical response at a desired wavelength such as 1.3 $\mu$m or 1.55 $\mu$m. The photodetector converts the optical signal to electrical signal, which is then amplified by an amplifier.

A further object of the present invention is to provide the means that can amplify the electrical signal from the photodetector. The amplifier comprises heterojunction bipolar transistors (HBTs) using silicon-germanium alloy as the base layer. The HBTs are batch-processed using similar fabrication procedures as the silicon-based electronic integrated circuit chips.

A further object of the present invention is to provide of the present invention the electrical signals amplified by the amplifier, which are representative of the incoming optical information, to the silicon electronic integrated circuits for data processing.

Yet another object of the present invention is to provide the means to modulate the light from another branch of the guided light split from the incoming light by using an optical modulator according to the electrical signal from the local computer. The modulated light is then fed back to the outgoing fiber.

Various other objects, advantages and features of the present invention will become readily apparent from the ensuring detailed description, and the novel features will be particularly pointed out in the appended claims.

BRIEF DESCRIPTION OF THE DRAWINGS

A complete understanding of the present invention and of the above other features and advantages thereof can be gained from a consideration of the following detailed description presented hereinbelow in connection with the accompanying drawing, not to scale, in which.

DETAILED DESCRIPTION OF PREFERRED EMBODIMENTS

Figure 1:
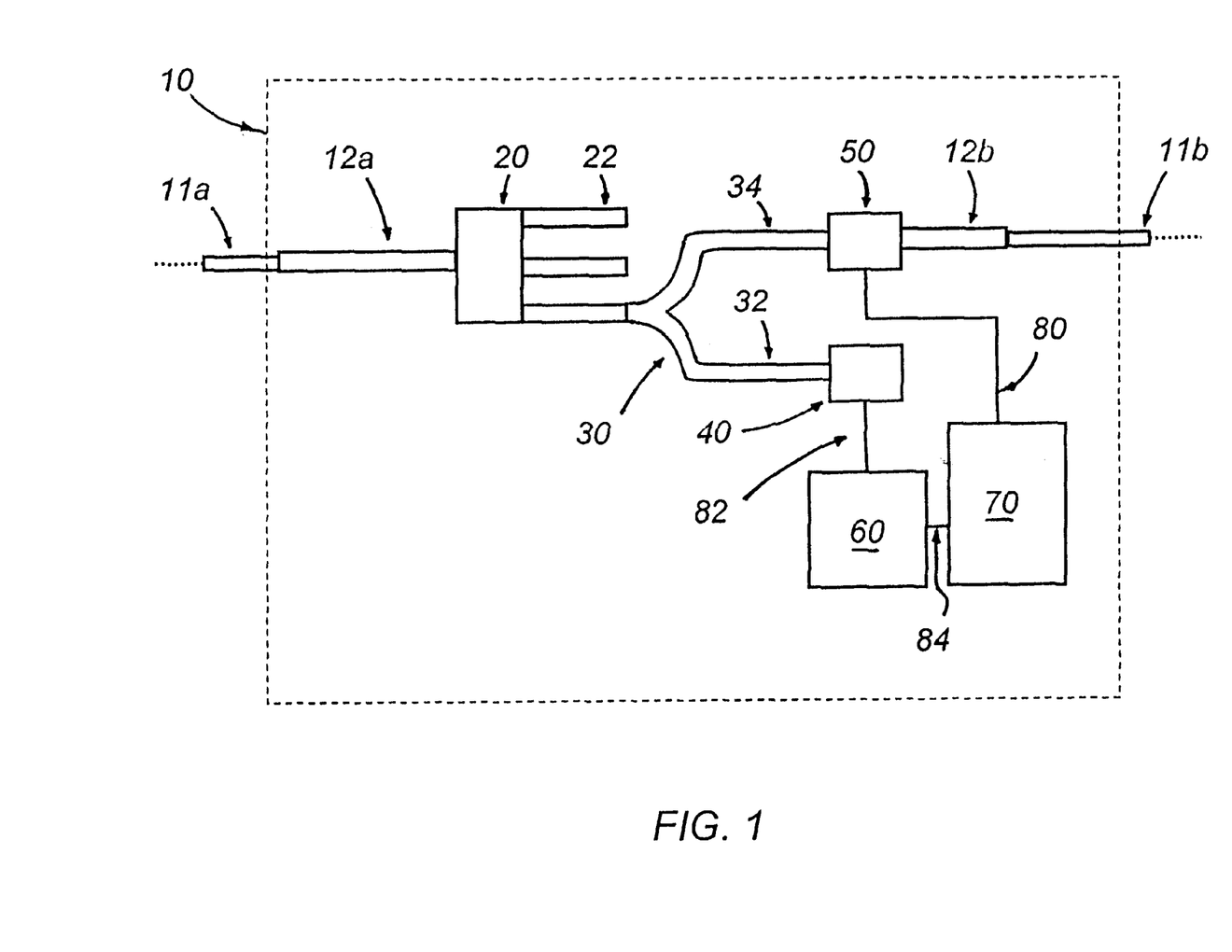
FIG. 1 is a schematic representation of a known type of optical network unit to which the principle of the present invention is applicable.

A schematic depiction of a conventional optical network unit is shown in FIG. 1 within the dashed line box 10. Incoming optical signals from, for example, a central office is applied to the unit via an input optical fiber 11a. Outgoing optical signals from the unit 10 are transmitted via an output optical fiber 11b. The optical wavelength in the fiber is 1.3 $\mu$m or 1.55 $\mu$m for low loss transmission.

Incoming light from fiber 11a is coupled to the network unit 10, via either facet coupling or evanescent coupling to a waveguide. In the case of facet coupling, the fiber tip and waveguide end are cleaved, and disposed in close proximity to each other. In the case of evanescent coupling, the fiber and waveguide are polished along the side wall, and disposed in close proximity along the side-wall to each other. The optical signal is traveling through silicon-on-insulator (SOI) waveguide from the incoming fiber to the detector, from the modulator to the outgoing fiber, and also between the photodetector and modulator. In one preferred embodiment, the incoming light from the fiber traveling through the waveguide 12a is split into two portions by an optical splitter 30 that can be a conventional optical coupler. A first portion of the incoming signal 32 (can be a big portion for a large electrical signal output) is directed by the optical splitter 30 to a photodetector 40 comprising silicon-germanium and silicon multi-layered p-i-n photodiode. A second portion of the incoming signal 34 from the optical splitter 30 is routed to a pn diode optical modulator 50.

Between the incoming waveguide 12a and the optical splitter 30 there is a wavelength division de-multiplexer (WDM) 20 provided to separate the multiple wavelengths carried in the fiber system. The multi-channel output from the wavelength division de-multiplexer 20 is a single wavelength signal 22 for each channel, which can then be directed to the optical splitter 30.

The photodetector 40 provides an electrical output signal, representative of the incoming optical information from the fiber system, which is then magnified by an amplifier 60. The amplifier comprises at least one heterojunction bipolar transistor (HBT) using silicon-germanium alloy as the base layer. As compared to the conventional silicon CMOS amplifier the HBT can be operated at a much higher frequency. The input of the amplifier 60 is the electrical signal from the output of the photodetector 40 via an electrical lead 82. The output of the amplifier 60 is then fed to the base of a subsequent amplifier. A series of such amplifiers 60 can be used to achieve a desirable level of amplification. The final output signal is fed via an electrical lead 84 into customer silicon-based integrated circuits 70 such as a computer. This part of the network unit enables the down-loading of the information from the fiber system to the local computer.

The information provided from the local electrical integrated circuits 70 that the customer wants to transmit to the fiber system is supplied to the modulator 50 via an electrical lead 80. The modulator 50 alters the portion of the incoming light 34 from the beam splitter 30, according to the input electrical signal. The outgoing light from the modulator 50 with information from the local computer embedded in it is then feed back to the outgoing fiber 11b.

Figure 2:
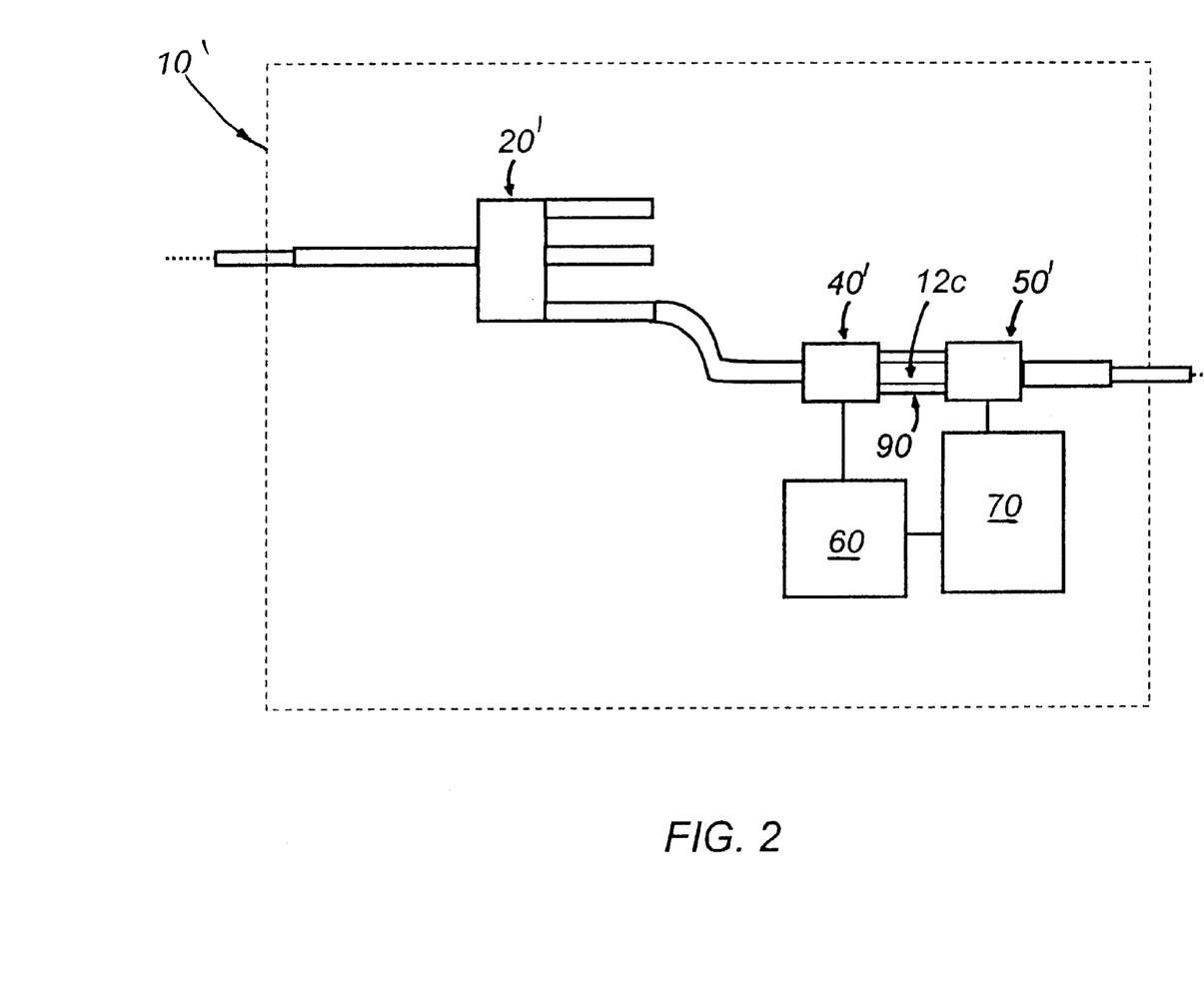
FIG. 2 is a simplified alternative mode of the scheme depicted by FIG. 1, yet can perform the same function as FIG. 1.

In another preferred embodiment, as illustrated in FIG. 2, a photodetector 40' is optically connected with and electrically isolated from an optical modulator 50', via an optical waveguide 12c and a dielectric passivation layer 90 respectively. The optical splitter 30 as shown in FIG. 1 is no longer needed in this design. The length of the detector is designed such that a desired portion of the light will be transmitted to the modulator 50' after passing through the photodetector 40.

Figure 3:
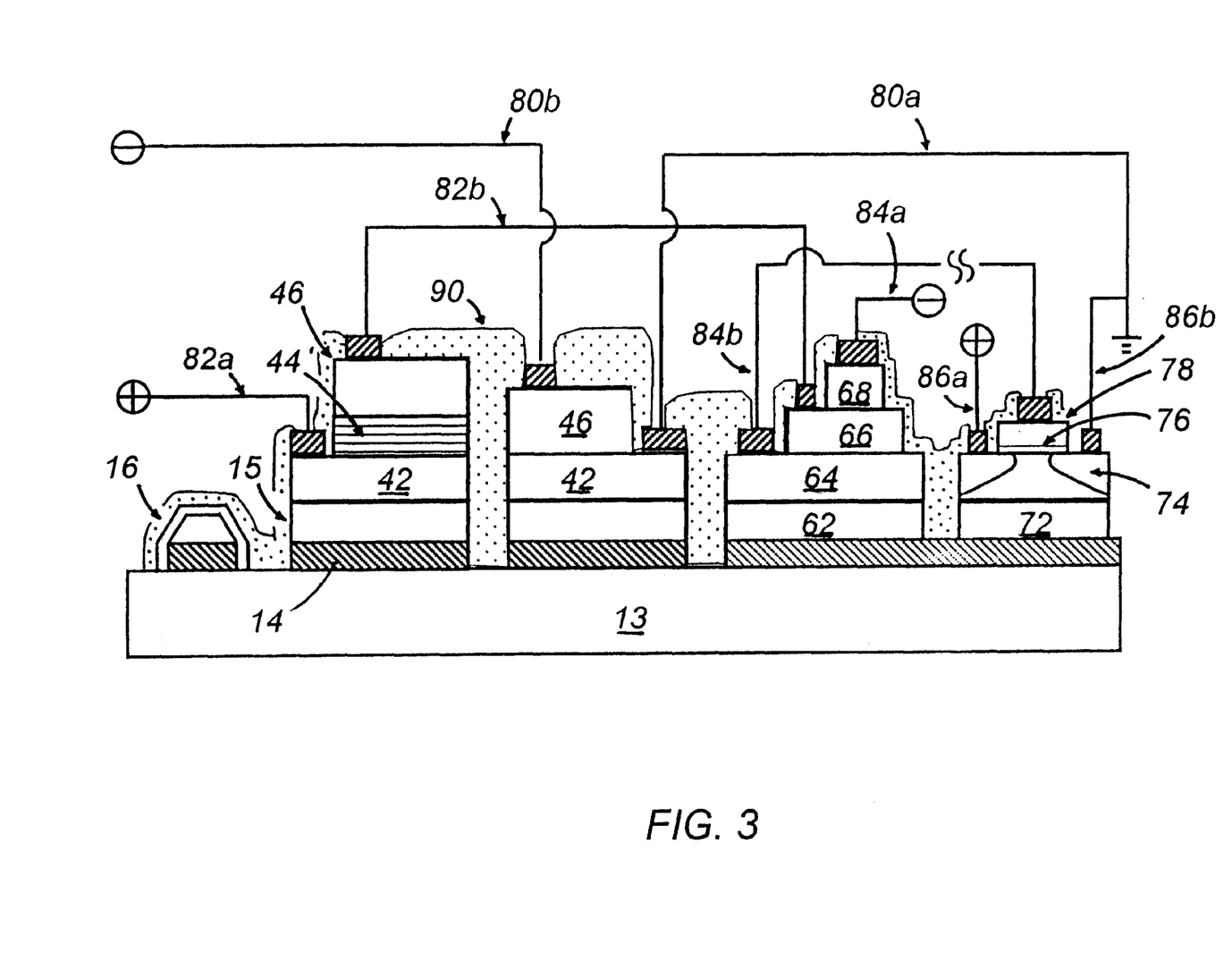
FIG. 3 is a cross-sectional view (perpendicular to the traveling light) of a multilayered structure from which, in accordance with the invention, the individual components of FIG. 1 are to be built in an integrated-circuit fashion.

In accordance with the principles of the present invention, the entire unit 10 is fabricated in an integrated circuit form. The multi-layered structure of the films is depicted in FIG. 3. Starting from a silicon or silicon-on-insulator (SOI) substrate available for ultra large scale integrated circuit (ULSI) manufacturing, a sequence of film deposition, lithography, etching, ion implantation, and metal deposition well known to those skilled in the art of semiconductor fabrication will be performed to form the integrated circuit unit 10.

Refer to FIG. 3, the incoming and outgoing waveguides 12a and 12b, and waveguides between the optical splitter 30, photodetector 40, and modulator 50 can be formed by etching a rib structure on a silicon-on-insulator substrate. The silicon-on-insulator structure has a silicon bulk substrate 13 normally 300 $\mu$m–500 $\mu$m thick. A silicon dioxide layer 14 has a typical thickness of 0.5 $\mu$m–5 $\mu$m. On top of the silicon dioxide 14 is a crystalline silicon layer 15 with a thickness of 0.5 $\mu$m–5 $\mu$m. This layer serves both as a light confining layer for the waveguide and the starting layer for subsequent epitaxial layer-by-layer growth of other device films. The surface of the rib waveguide is protected by a dielectric layer 16 such as silicon-nitride or polyimide.

If a bare silicon substrate is used without the SOI structure, the waveguide can be formed on the silicon bulk substrate 13 through ion implantation to form a dielectric layer buried underneath the crystalline silicon layer.

The amplifier 60 can be constructed from heterojunction bipolar transistors (HBTs) with a silicon-germanium base layer fabricated by the advanced BiCMOS technology, which integrates the mature CMOS circuitry into the system. The formation of a $n^+$-type silicon sub-collector 62, a $n^-$-type silicon collector 64, a p-type silicon-germanium base 66, and a $n^+$-type poly-crystalline silicon (poly-silicon) emitter 68 is fully integrated into the fabrication CMOS devices as well known to those skilled in the art of advanced BiCMOS processing.

The silicon ULSI circuits are built based on conventional CMOS circuitry 70. A part of the CMOS 70 device comprising of a p-type field effect transistor (PFET) is depicted in FIG. 3. The implanted n-type silicon forms a channel 72 for the PFET. Implantation of $p^-$-type dopants forms the source and drain 74. A thermally grown silicon dioxide forms a gate 76. Finally, a poly-silicon conductor 78 is deposited on top of the $SiO_2$ gate for gate contact.

Again, refer to FIG. 3, parts of the layers for the BICMOS circuit will be shared by the fabrication of the photodetector 40 and the modulator 50. The same layer as the HBT silicon collector 64 will be further implanted in the area forming a bottom n-type contact 42 for the photodetector 40 and the modulator 50. A multi-layered silicon-germanium (or silicon-germanium-carbon) alloy sandwiched between the silicon layers to form an optical absorption layer 44 in the pin diode photodetector 40 is then selectively deposited on patterned areas of the circuit chips with the other areas protected by dielectric films such as silicon-dioxide. An $p^+$-type silicon layer 46 overlies the optical absorption layer 44 forming a top p-type contact 46 for the photodetector 40. The top $p^+$-type contact layer is also shared by the modulator forming the top $p^+$-type contact for the modulator 50. The multi-layered silicon-germanium/silicon optical absorption layer 44 can also be formed by deposition of a uniform film over the whole substrate and by subsequent etching to form the pin diode with a needed dimension. In the strained multi-layered silicon-germanium alloy, the germanium content and layer thickness are determined by the sensitivity of the hotodetector 40. For efficient detection at 1.55 $\mu$m, a germanium concentration of more than 50% and an overall thickness of more than 100 nm are required.

In another preferred embodiment, the multi-layered silicon-germanium/silicon structure is replaced by a strained relieved silicon-germanium alloy grown on a very thin silicon film on top of a SOI structure as the active absorption layer for the photodetector 40. Under high temperature anneal the strain can be transferred from the silicon-germanium to the underneath thin silicon film, allowing the deposition of a thick silicon-germanium film free from dislocations.

The optical modulator 50 can be formed by a pn diode. In a preferred embodiment, the optical modulation 50 is achieved through injection of current into the pn diode and change the carrier density along the path of the waveguide, which will change the refractive index of the waveguide media based on the plasma (or free carrier) optical effect. Due to the change in the complex refractive index, the phase or amplitude of the light traveling through the modulator 50 will be altered by the electrical signal applied to the pn diode, wherein Mach-Zehnder type modulator can be used to achieve amplitude modulation from the phase change, which is not shown in the drawings. In another preferred embodiment, optical modulation is achieved based on free carrier effect in a metal oxide semiconductor (MOS) transistor, wherein the current is modulated by the gate voltage, which subsequently changes the free carrier density in the transistor to achieve the phase or amplitude modulation.

In another preferred embodiment, the modulation scheme includes the multiple quantum well optical modulator. The active layer of the modulator comprises silicon-germanium alloy with a bandgap slightly larger than the modulated light wavelength. Without an external bias, the medium is transparent to the traveling wave. Under an external bias, the absorption coefficient increases as the bias voltage increases, and the amplitude of the optical wave will decrease. These modulation devices and schemes are not shown in the drawings.

Figure 4:
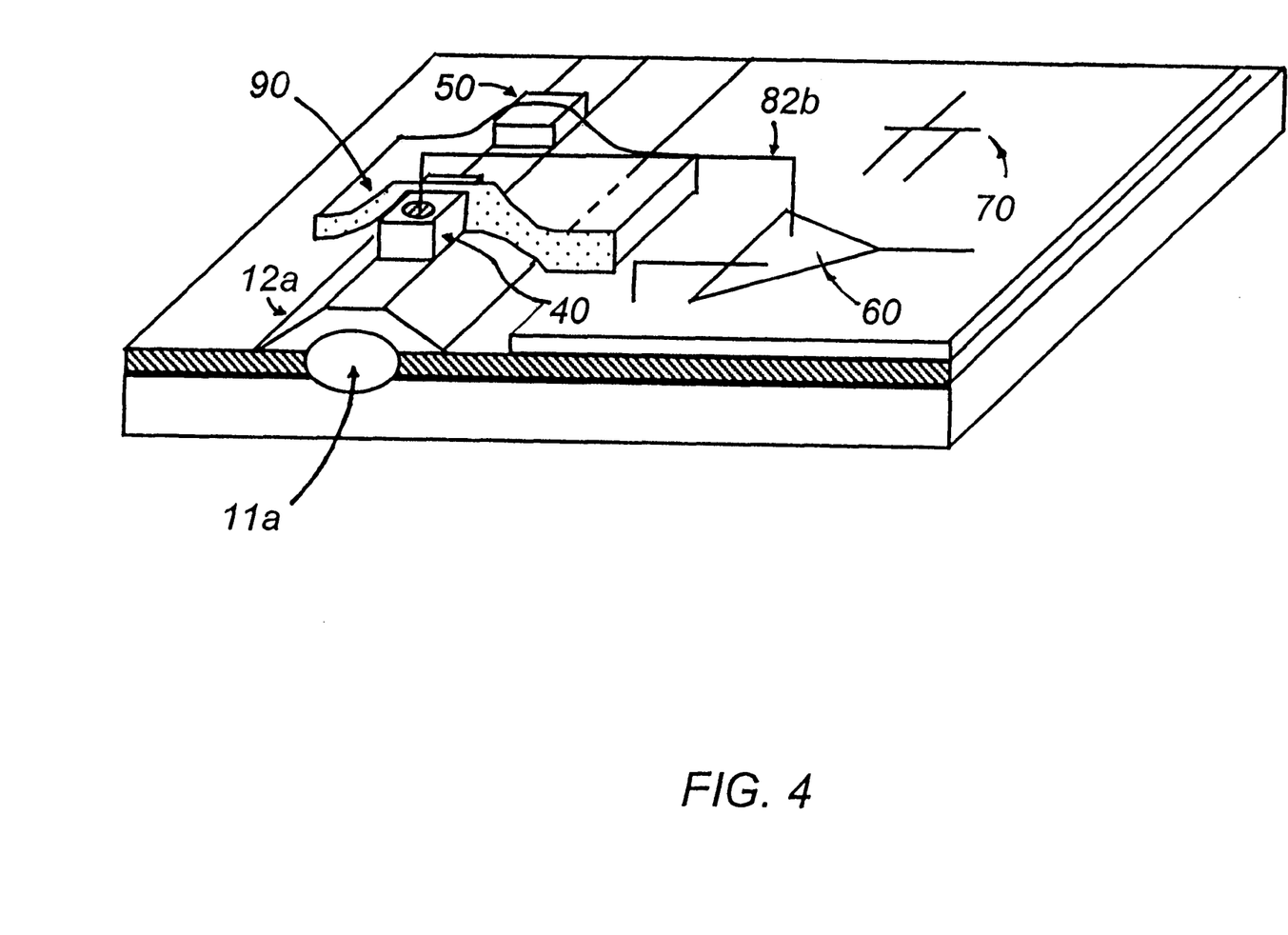
FIG. 4 is a schematic plane view of the waveguide p-i-n photodetector and optical modulator as depicted in FIG. 2, wherein the p-i-n photodetector and modulator are optically connected but electrically isolated.

It is to be understood that the relative position of the photodetector 40 and modulator 50 in FIG. 3 is only illustrative. In a scheme depicted by FIG. 2, the modulator 50 is positioned along the same axis as the waveguide used by the photodetector 40, which is indicated in FIG. 4 with a plane view of the layout for photodetector 40 and modulator 50. In fact, the waveguide shared by the photodetector 40 and the modulator 50 is actually an extension of the incoming waveguide 12a, in a design without the WDM de-multiplexer. For WDM system, the waveguide shared by the photodetector 40 and the modulator 50 is an extension of each channel with a single wavelength output.

Figure 5:
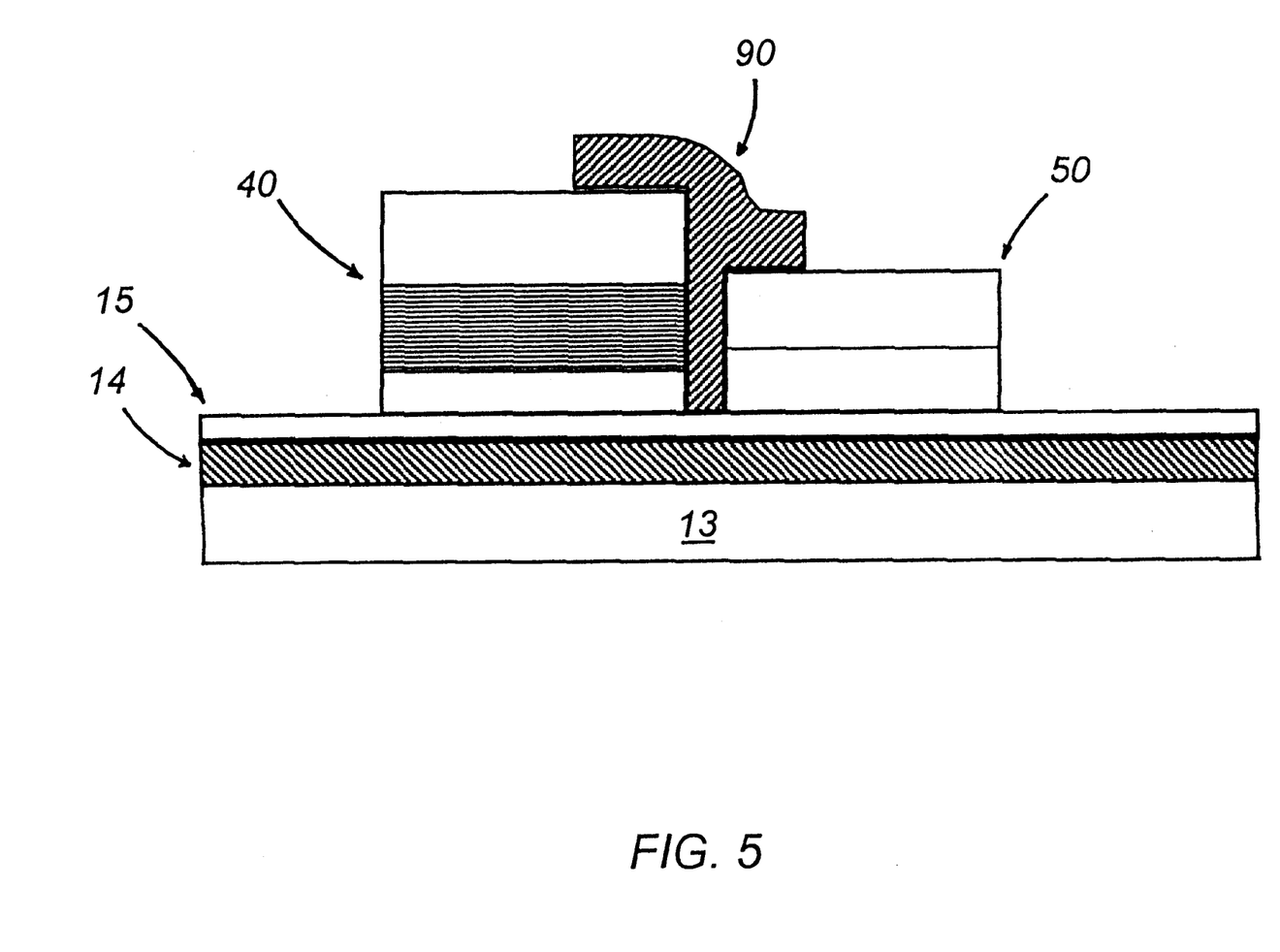
FIG. 5 illustrates a cross-sectional view (parallel to the traveling light in the waveguide) of the p-i-n photodetector and modulator.

The cross sectional view of the photodetector 40 and the modulator 50 along the axis of the waveguide parallel to the optical beam is shown in FIG. 5. The incident light is traveling along a waveguide core 15 and partially absorbed by the photodetector 40 through evanescent coupling. The remaining portion of the light travels further along the waveguide 12c to the modulator 50. It can be seen that, effectively, the waveguide 12c and the photodetector 40 together serve as a beam splitter to direct different branches of light to photodetector 40 and the modulator 50. The photodetector 40 and the modulator 50 are connected optically via a waveguide, but isolated by dielectric films 90 such as polyimide to achieve separate electrical contact to the photodetector 40 and the modulator 50.

An important figure of merit for the photodetector 40, HBT amplifier 60, and modulator 50 are the frequency response. The device dimension has to be small enough for high speed response to enable the device to operate at a multi-gigabit/s speed or even higher.

In conventional ways, metallic contacts are then made to the patterned portions of the specified layers of the photodetector 40, modulator 50, HBT amplifiers 60, and CMOS circuits 70. Subsequently, the entire structure on the substrate in FIG. 3 is overlaid with a suitable dielectric material such as polyimide. The dielectric material is to form isolation between different devices and different contact layers within each device. Conventional trench isolations such as deep trench and shallow trench isolation can also be used. To form electrical contact through the dielectric, the dielectric is etched to open windows overlying the metallic contacts, and conductive interconnect lines are then defined on the dielectric surface. Such interconnect lines, carrying electrical signal or supplying external bias voltage, include a first interconnect line 80a connecting the modulator 50 bottom electrode to the ground, a second interconnect line 80b connecting application of the electrical signal from the CMOS circuits 70 to the modulator 50, a third interconnect line 82a supplying of external bias voltage to the photodetector 40, a fourth interconnect line 82b supplying the output electrical signal to the HBT amplifier 60, a fifth interconnect line 84a connecting the HBT emitter 68 to ground, a sixth interconnect line 84b supplying bias voltage to the HBT collector 64 and current from the collector to the base 66 of a subsequent HBT, a seventh interconnect line 86b supplying CMOS circuits 70 bias voltage, and an eighth interconnect line 86b connecting CMOS source contact 74 to the ground.

Illustratively, the optical fiber 11a, which is disposed in close proximity and with its longitudinal axis parallel to the planar waveguide formed in the substrate 12a, is utilized to launch optical signal from the fiber to the network unit 10, as shown in FIG. 4. Similarly, the optical fiber 11b, which is disposed in close proximity and with its longitudinal axis parallel to the planar waveguide formed in the substrate 12b, is utilized to transmit the optical signal from the network unit 10 back to the fiber system, as shown in FIG. 1.

Waveguide structure is formed in the silicon-on-insulator substrate to guide optical waves through the circuit chip, such as from the incoming fiber to the photodetector 40, and from the modulator 50 to the outgoing optical fiber 1 1b. The incoming optical signal propagates along the waveguide 12a, which can contain multiple wavelength signals in the WDM system for larger data carrying capability, is first de-multiplexed by the de-multiplexer 20. In each channel of the output of the de-multiplexer 20, there contains only single wavelength optical signal, as shown in FIG. 1.

The optical signal from the incoming optical waveguide, or from the de-multiplexer 20 in the WDM system, is guided to the photodetector 40 in FIG. 4. The pin photodiode is reverse biased with a certain supplied voltage, e.g., 10 V, to sweep all the optically generated carrier to the electrode. The output of the electrical signal from the photodetector 40 is sent to the base of a HBT amplifier 60 via the fourth interconnect line 82b. The electrical signal is then amplified by a series of HBT amplifiers 60, and finally sent to the CMOS circuits 70 for data processing.

The photodetector 40 is designed in such a way so that only a portion of the incident optical light is absorbed by the photodetector 40, for example, more than 50% of the incident optical power. The remaining portion of the optical light (less than 50%) is traveling out of the photodetector 40, and guided by a waveguide to the modulator 50.

The optical modulator 50 is optically coupled to, but electrically isolated from the photodetector 40 by a dielectric film 90. In this way, electrical signal to the modulator 50 can be sent separately from the photodetector 40. As indicated in FIG. 3 the modulator 50 is connected via the second interconnect line 80b to receive modulating electrical signals from the local CMOS circuits 70.

As mentioned earlier above, the electrical signal generated by the photodetector 40 is connected to the base of the HBT amplifier 60 via the fourth interconnect line 82b. The emitter contact 68 of the HBT amplifier 60 is connected via the fifth interconnect line 84a to a direct-current bias supply having a value between +3 volts and +5 volts. Normally, the collector contact 64 is connected to the base of another identical HBT amplifier 60 via the sixth interconnect line 84b. After being amplified by a series of such HBT amplifiers 60, the signal from the last HBT collector 64 is applied through a resistor to the CMOS circuits 70.

The present optical network unit can be made in a relatively low cost, highly compact, and robust manner. As compared to the InP-based or GaAs-based optical network unit, the silicon-based silicon-germanium alloy, combined with a silicon-on-insulator substrate to form the network unit using waveguide detectors and modulators as disclosed by the present invention, enables the full integration of opto-electronic devices with the silicon-germanium heterojunction bipolar transistors and the silicon-based very large scale integrated circuits. The availability of such units promises the realization of network system in which optical signals can be delivered to and received from small computer network service providers or even individual computer users.

Finally, it is to be understood that the aforementioned devices and arrangements are only illustrative of the principles disclosed by the present invention. Variations in the design of specific device and arrangement may be devised without departing from the scope of the present invention.

What is claimed is:

1. An optical network unit, comprising:
   a silicon substrate;
   a silicon-on-insulator structure provided on said silicon substrate forming a waveguide;

a first multi-layered structure, which is provided on a first portion of a top surface of said waveguide including bottom and top sets of layers, comprising a photodetector section responsive to an incoming optical signal which is guided into said first multi-layered structure via a portion of said waveguide underlying said photodetector section for absorbing a portion of said guided optical signal and generating an electrical signal in response thereto while allowing a remaining unabsorbed portion of said guided optical signal to propagate through said photodetector section, and a modulator section;

a second multi-layered structure provided on a second portion on top of said silicon substrate, said second multi-layered structure constituting an amplifier and an integrated circuit, wherein said modulator section is responsive to said applied electrical signal from said integrated circuit for modulating said remaining unabsorbed portion of said optical signal;

means for electrically connecting said modulator section to said integrated circuit; and means for electrically connecting said photodetector section to said amplifier.

2. An optical network unit, as recited in claim 1, further comprising an input optical fiber means for coupling said incoming optical signal into said first multi-layered structure and an output optical fiber means for transmitting said optical signal emitted from said first multi-layered structure.

3. An optical network unit, as recited in claim 2, wherein said input optical fiber means comprises an etched groove which has a main longitudinal axis and includes input and output ends, wherein said output end is disposed in a close proximity to a front end of said waveguide in said first multi-layered structure and said main longitudinal axis coincides with said waveguide.

4. An optical network unit, as recited in claim 2, wherein said output optical fiber means comprises an etched groove which has a main longitudinal axis and includes input and output ends, wherein said output end is disposed in a close proximity to said back end of said waveguide in said first multi-layered structure and said main longitudinal axis coincides with said waveguide.

5. An optical network unit, as recited in claim 2, wherein each of said input optical fiber means and said output optical fiber means comprises an etched groove which has a main longitudinal axis and includes input and output ends, wherein said output end is disposed in a close proximity to said back end of said waveguide in said first multi-layered structure and said main longitudinal axis coincides with said waveguide.

6. An optical network unit, as recited in claim 1, wherein said photodetector section comprises a silicon-germanium and silicon multi-layered p-i-n photodiode.

7. An optical network unit, as recited in claim 1, wherein said modulator section comprises a multi-layered pn diode modulator.

8. An optical network unit, as recited in claim 6, wherein said modulator section comprises a multi-layered pn diode modulator.

9. An optical network unit, as recited in claim 8, further comprising layers in said first multi-layered structure interposed between said silicon-germanium and silicon multilayered p-i-n photodiode and said multi-layered pn diode modulator for providing electrical isolation between said photodetector section and said modulator section.

10. An optical network unit, as recited in claim 9, wherein said silicon-germanium and silicon multi-layered p-i-n photodiode includes a silicon-germanium alloy sandwiched between silicon layers forming an absorption layer for said silicon-germanium and silicon multi-layered p-i-n photodiode, and n-type doped silicon and p-type doped silicon as contact layers.

11. An optical network unit, as recited in claim 10, wherein said multi-layered pn diode modulator includes an undoped layer of silicon in between said n-type and p-type doped silicon contact layers.

12. An optical network unit, as recited in claim 1, wherein said amplifier comprises at least a heterojunction bipolar transistor utilizing silicon-germanium alloy as a base layer.

13. An optical network unit, as recited in claim 11, wherein said amplifier comprises at least a heterojunction bipolar transistor utilizing silicon-germanium alloy as a base layer.

14. An optical network unit, as recited in claim 1, further comprising means for applying said electrical signals from said integrated circuit to said modulator and means for sending said electrical signals from said photodetector to said amplifier.

15. An optical network unit, as recited in claim 11, further comprising means for applying said electrical signals from said integrated circuit to said modulator and means for sending said electrical signals from said photodetector to said amplifier.

16. An optical network unit, as recited in claim 13, further comprising means for applying said electrical signals from said integrated circuit to said modulator and means for sending said electrical signals from said photodetector to said amplifier.

* * * * *